March 16, 1971  R. S. HORNACK ET AL  3,570,316

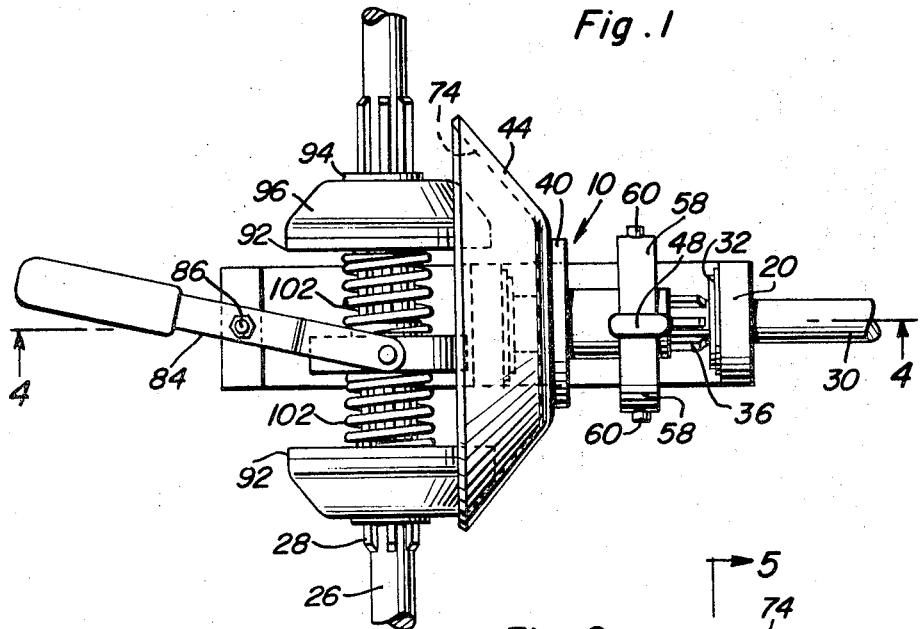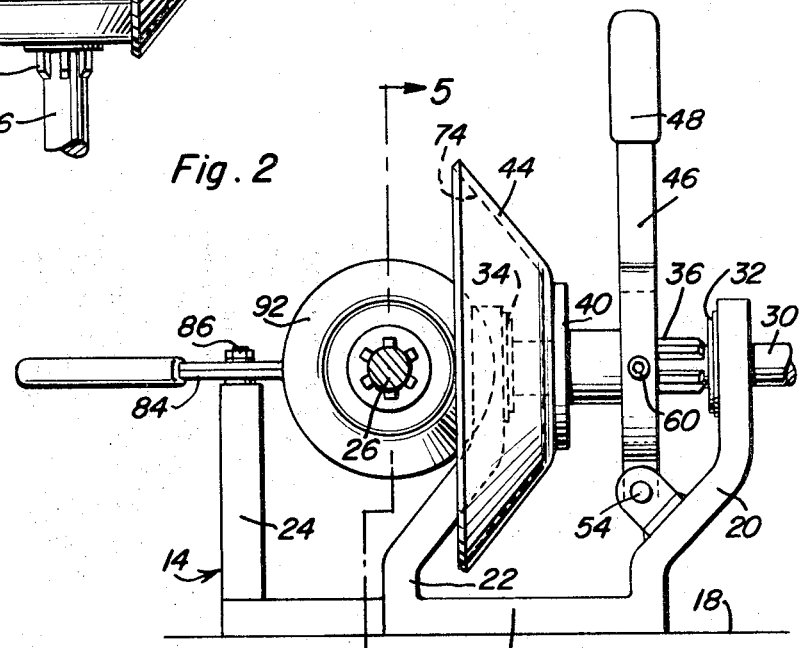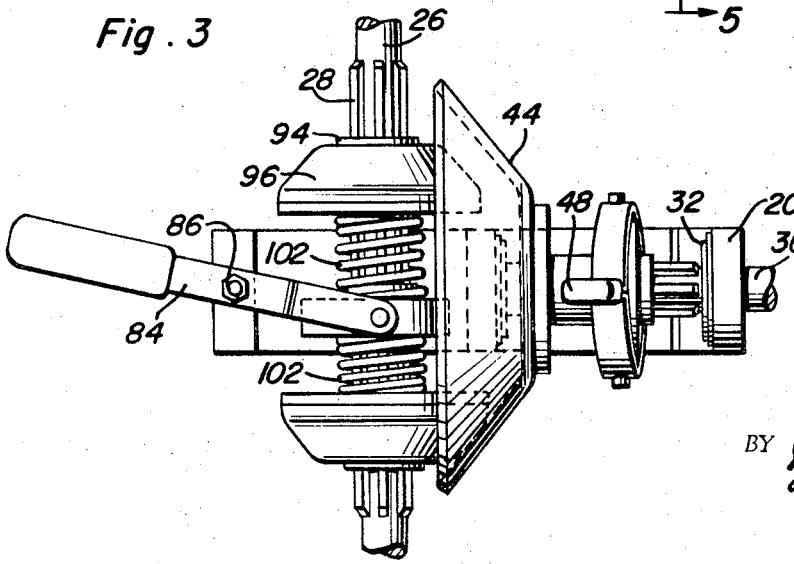
Richard S. Hornack
Gustave C. Heyman
INVENTORS

CONE CLUTCH AND REVERSIBLE DRIVE MECHANISM

Filed June 10, 1969  3 Sheets-Sheet 2

Richard S. Hornack
Gustave C. Heyman
INVENTORS

BY *Clarence A. O'Brien*
*and Harvey B. Jacobson*
Attorneys

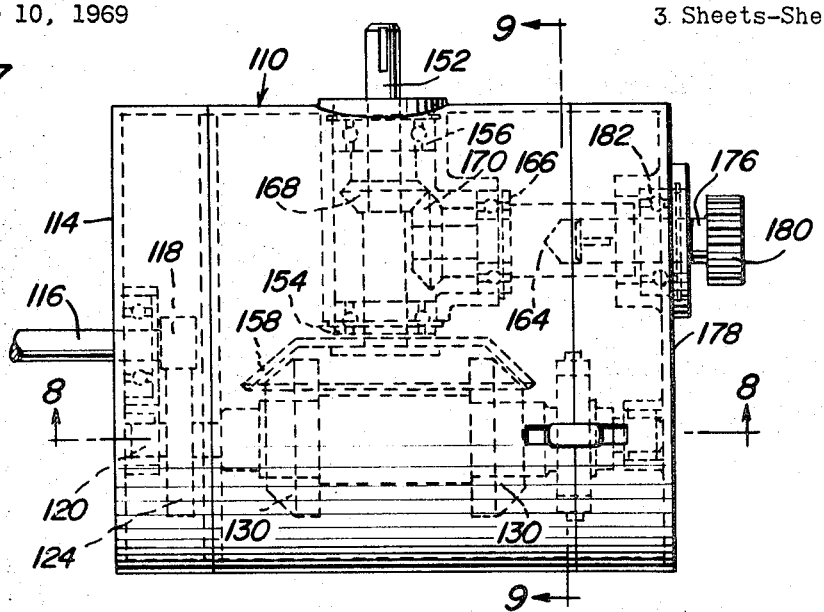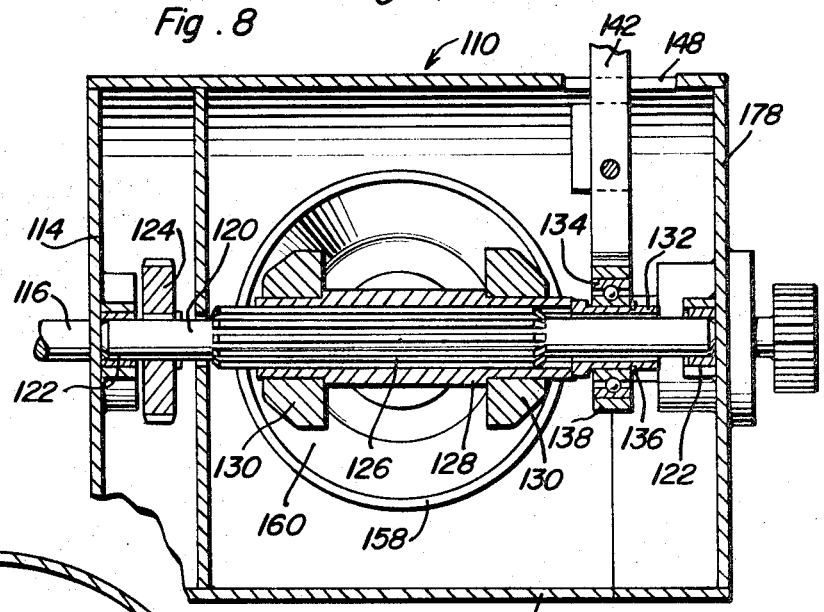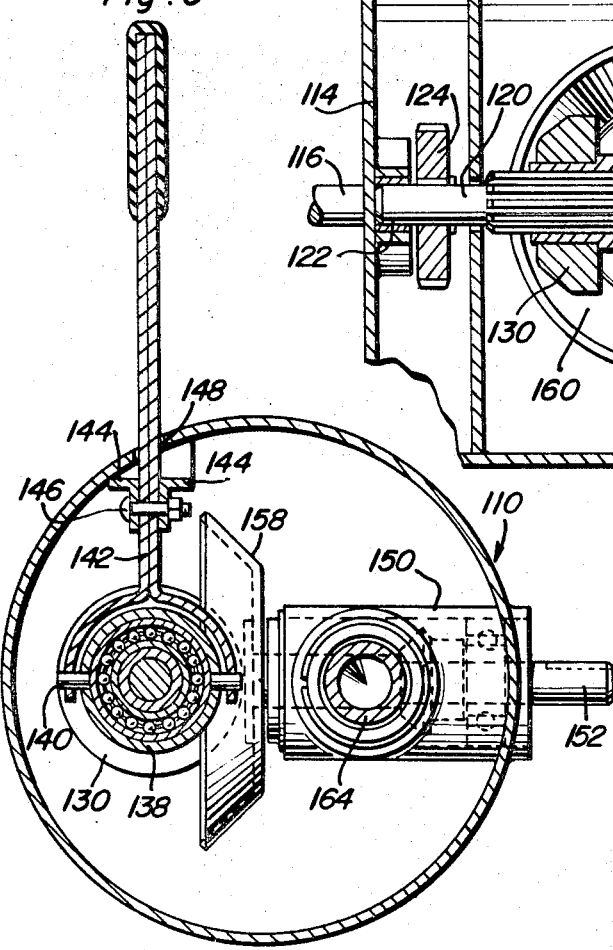

United States Patent Office 3,570,316
Patented Mar. 16, 1971

3,570,316
CONE CLUTCH AND REVERSIBLE DRIVE MECHANISM
Richard S. Hornack, 128 Drury Lane, Mayfield Heights, Ohio, and Gustave C. Heyman, 1120 S. Chillicothe Road, Streetsboro, Ohio 44240
Filed June 10, 1969, Ser. No. 831,919
Int. Cl. F16h *15/20;* F16d *13/30*
U.S. Cl. 74—191
6 Claims

ABSTRACT OF THE DISCLOSURE

First and second shafts journaled from a support for rotation about axes disposed at generally right angles to each other. A first friction cone is mounted on one of the shafts for rotation therewith and a pair of second pair of friction cones are mounted in axially spaced relation on the other shaft for similar shifting therealong and for rotation therewith. The second cones, when shifted, are alternately positionable in frictional engagement with the opposite side portions of the first cone, whereby a reversing transmission is provided. In addition, one form of the invention provides means whereby the first cone is adjustably shiftable along its axis of rotation.

---

The cone clutch and reversible drive mechanism of the instant invention has been designed to provide a structure by which a driven shaft may be selectively driven from a drive shaft and in opposite directions, if desired. The drive mechanism may be used with either of its shafts as the input shaft but for the purpose of describing the structure and operation thereof hereinafter, the shaft upon which the pair of drive cones is mounted will be considered as the input shaft.

In addition, although various angles may be utilized, it has been found that the angulation of the internal conical friction surfaces of the output drive member should be generally 52° relative to the axis of rotation of the output shaft. Further, various dissimilar materials may be utilized for forming the friction drive surfaces of the drive and driven cones.

The drive mechanism has been specifically designed to provide a convenient means whereby a driving shaft may be selectively clutched to a driven shaft for rotating the driven shaft in either direction. The drive mechanism may be utilized in many different environments and powered by various sources of power and therefore it is contemplated that the drive mechanism may be readily constructed of various capacities so as to further its usefulness in diverse fields of endeavor.

The main object of this invention is to provide a drive assembly operable to drive a driven shaft from a drive shaft in either direction of rotation as desired and which includes a simple control for reversing the direction of drive established thereby.

Another object of this invention is to provide a drive mechanism including operational features which enable the drive ratio between the drive and driven members thereof to be infinitely varied between predetermined limits.

Yet another object of this invention is to provide a drive mechanism in accordance with the preceding objects that may be readily constructed of various sizes so as to accommodate various amounts of power to be transmitted thereby.

A final object of this invention to be specifically enumerated herein is to provide a drive mechanism which will conform to conventional forms of manufacture, be of simple construction and easy to use so as to provide a device that will be economically feasible, long lasting and relatively trouble-free in operation.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIG. 1 is a top plan view of a first form of drive mechanism constructed in accordance with the present invention;

FIG. 2 is a front elevational view of the drive mechanism illustrated in FIG. 1;

FIG. 3 is a further top plan view of the drive mechanism with the output drive member thereof shifted along its axis of rotation so as to vary the drive ratio established by the drive mechanism;

FIG. 7 is a top plan view of a modified form of drive mechanism constructed in accordance with the present invention;

FIG. 8 is a fragmentary vertical sectional view taken substantially upon the plane indicated by the section line 8—8 of FIG. 7 and on somewhat of an enlarged scale; and FIG. 9 is an enlarged fragmentary vertical sectional view taken substantially upon the plane indicated by the section line 9—9 of FIG. 7.

Figure 4:
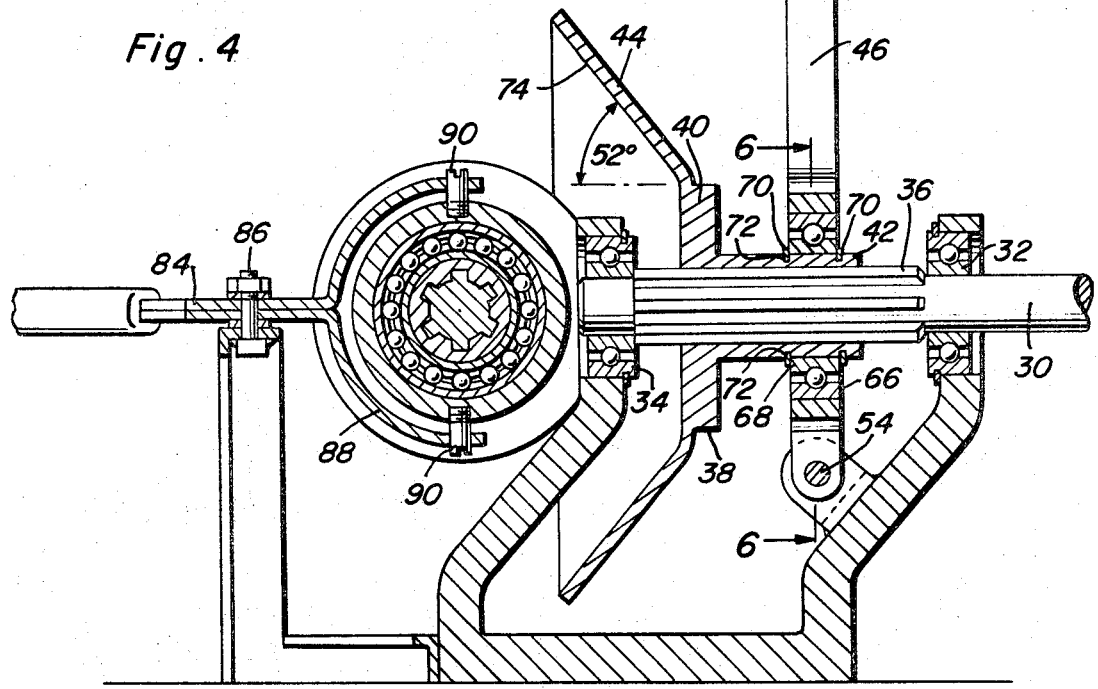
FIG. 4 is an enlarged vertical sectional view taken substantially upon the plane indicated by the section line 4—4 of FIG. 1.

Referring now more specifically to the drawings, the numeral 10 generally designates a first form of the invention which includes a support structure referred to in general by the reference numeral 14. The stucture 14 includes a base plate 16 adapted to be secured to any suitable supporting surface such as surface 18 and the base plate 16 includes three uprights 20, 22 and 24. A first power input shaft 26 is journaled by any conventional means (not shown) for rotation about an axis stationarily positioned relative to the support structure 14 and a central portion of the power input shaft 26 is splined as at 28.

In addition, an output shaft 30 is journaled through suitable bearings 32 and 34 supported from the uprights 20 and 22, respectively, and the output shaft 30 is splined intermediate the bearings 32 and 34 as at 36.

Figure 5:
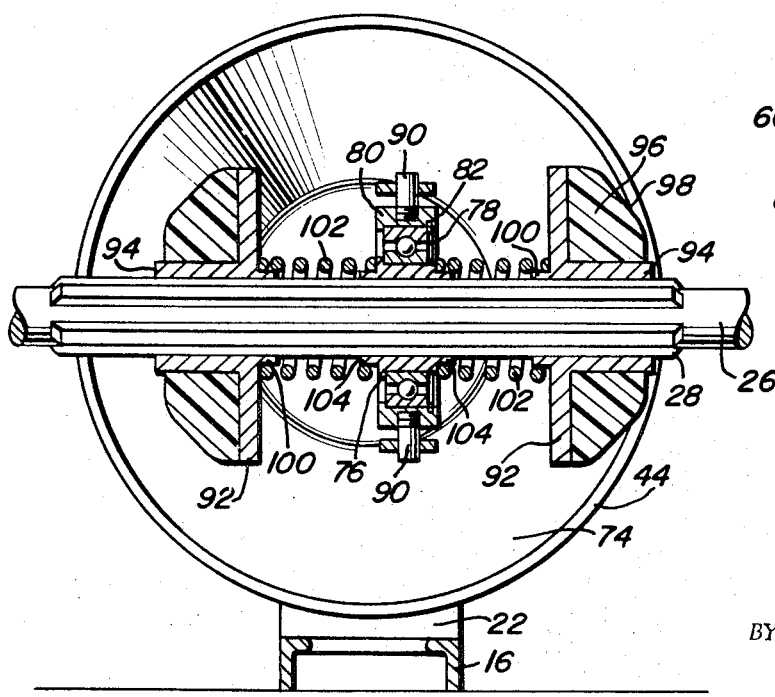
FIG. 5 is a fragmentary enlarged vertical sectional view taken substantially upon the plane indicated by the section line 5—5 of FIG. 2.
Figure 6:
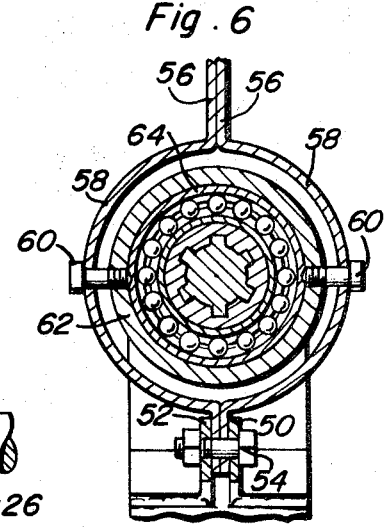
FIG. 6 is a fragmentary vertical sectional view taken substantially upon the plane indicated by the section line 6—6 of FIG. 4.

With attention now invited more specifically to FIGS. 4 and 5 of the drawings, it may be seen that a first drive member 38 including a support flange portion 40 and a splined sleeve portion 42 is mounted on the splined portion 36 for rotation therewith and longitudinal shifting therealong. In addition, the drive member 38 includes a conical friction disk 44 supported from the outer periphery of the support flange portion 40 and a lever 46 is provided and includes a handgrip 48 on one end and has its other end pivotally supported between a pair of mounting ears 50 and 52 carried by the upright 20 by means of a pivot pin 54. The lever 46 is formed of identical right and left hand strap members 56 which include registered semi-cylindrical portions 58 that open toward each other so as to define a cylindrical opening adjacent the end of the lever pivotally supported from the upright 20. The semi-cylindrical portions 58 have setscrews 60 secured therethrough and threadedly engaged in an outer sleeve in which the outer race 64 of a bearing 66 is pressed. The bearing 66 includes an inner race 68 held captive between snap rings 70 seated in grooves 72 extending circumferentially about the sleeve portion 42. Accordingly, oscillation of the upper end of the lever 46 will cause the drive member 38 to be reciprocated longitudinally of the splined portion 36 of the shaft 30.

The friction disk 44 includes a conical inner surface 74 and may be constructed of any suitable material. The inner surface 74 is angled approximately 52° relative to the longitudinal axis of the shaft 30. While it has been found that approximately 52° is the optimum angle at which the inner surface 74 should be inclined relative to the longitudinal axis of the shaft 30, it has further been found that the inner surface 74 may be inclined anywhere between 42 and 62° relative to the longitudinal centerline of the shaft 30.

A central splined sleeve 76 is disposed on the central portion of the splined area 28 on the power input shaft 26. The sleeve 76 has a bearing 78 pressed thereon and the bearing 78 is retained within an internally shouldered outer sleeve 80 by means of a snap ring 82. A lever 84 similar to the lever 46 is supported from the upper end of the upright 24 by means of a pivot bolt 86 and includes a semi-cylindrical end portion 88 which is secured to the sleeve 80 by means of setscrews 90 whose outer ends are rotatably received in the free ends of the end portion 88. Thus, the sleeve 76 may be reciprocated longitudinally of the splined portion 28 by oscillation of the lever 84.

A pair of drive members 92 including splined sleeve portions 94 are slidingly disposed on the splined portion 28 of the power input shaft 26 and include conical drive discs 96 provided with external conical friction surfaces 98. The drive members 92 are provided with axially short opposing neck portions 100 over which remote ends of a pair of compression springs 102 are tightly telescoped. In addition, the sleeve 76 includes oppositely facing neck portions 104 over which the adjacent ends of the compression springs 102 are tightly telescoped. Accordingly, oscillation of the lever 84 also functions to reciprocate the drive members 92 along the power input shaft 26.

In operation, the power input shaft 26 may be driven by any suitable source of power in order to cause the drive members 92 to rotate. Then, the lever 84 may be oscillated in either direction so as to bring one of the drive discs 96 into frictional engagement with the inner surface 74 of the friction disc 44. The friction surface 98 is disposed at an angle to initially establish a thin line contact with the friction disc 44 and to progressively increase the width and the length of contact as the pressure is increased to shift one of the drive discs 96 into frictional engagement with the inner surface 74 of the friction disc 44.

Any suitable means (not shown) may be utilized to secure the lever 84 in any selected position such as that illustrated in FIG. 1 of the drawings with the lower drive disc 96 engaged with the inner surface 74 of the friction disc 44. Then, if desired, the upper end of the lever 46 may be swung to the left as viewed in FIGS. 1 and 3 of the drawings in order to cause the lower drive disc 96 to be urged upwardly against the biasing action of the corresponding spring 102. This upward shifting of the lower drive disc 96 will of course cause the lower drive disc 96 to engage the inner surface 74 of the friction disc 44 along a path more closely spaced to the axis of rotation of the shaft 30. Accordingly, after the lever 84 has once been secured in the desired position, the lever 46 may be utilized to vary the ratio of the drive from the disc 96 to the disc 44.

Another operation of the drive mechanism 10 is that the lever 46 may be positioned as illustrated in FIGS. 1 and 4 of the drawings and the lever 84 may be secured in selected position with one of the drive discs 96 slightly spaced from the inner surface 74 of the friction disc 44. Then, the lever 46 may have its upper end swung to the left in order to move the inner surface 74 of the friction disc 44 into contact with the closer drive disc 96. Then, if it is desired to change the drive ratio established, the lever 46 may have its upper end swung further to the left.

With attention now invited more specifically to FIGS. 7–9 of the drawings, there will be seen a modified form of drive mechanism referred to in general by the reference numeral 110. The drive mechanism 110 includes a housing 112 which may be stationarily positioned and rotatably received through one end wall 114 thereof one end of a power input shaft 116. The power input shaft 116 has a gear wheel 118 mounted thereon within the housing 112 and a secondary input shaft 120 is journaled within the housing from bearings 122 and has a gear wheel 124 mounted thereon with which the gear wheel 118 is meshed. Accordingly, rotation of the power input shaft 116 will cause rotation of the shaft 120.

The central portion of the shaft 120 is splined as at 126 and a mounting sleeve 128 which is internally splined is disposed on the splined portion 126 of the shaft 120 and is therefore keyed to the shaft 120 for rotation therewith and longitudinally slidable therealong. The opposite ends of the sleeve 128 are diametrically reduced and have a pair of friction drive discs 130 mounted thereon for rotation therewith and for shifting longitudinally of the shaft 120 with the sleeve 128. Further, one end of the sleeve 128 includes a sleeve extension 132 upon which a bearing 134 is retained by means of a snap ring 136. The bearing 134 is pressed within a mounting sleeve 138 and the mounting sleeve 138 includes a pair of diametrically opposite outwardly projecting pivot shafts 140 by which the mounting sleeve 138 is oscillatably supported from the bifurcated end of a lever 142. The lever 142 is oscillatably supported from brackets 144 supported within the housing 112 by means of a pivot fastener 146 and the handle end of the lever 142 projects through a slot 148 formed in the housing 112. Accordingly, oscillation of the lever 142 will cause the sleeve 126 and the friction discs 130 supported therefrom to be reciprocated longitudinally of the shaft 120.

A support sleeve 150 is stationarily supported within the housing 112 and rotatably journals a shaft 152 therethrough. The shaft 152 is supported by bearings 154 and 156 and has a friction disc 158 mounted on its inner end. The friction disc 158 includes an inner friction surface 160 between which the friction discs 130 are received and the sleeve 150 also journals one end of a second shaft 164 by means of a bearing 166. The shaft 164 generally parallels the power input shaft 116 and is disposed at generally right angles to the shaft 152. Further, a bevel gear 168 is mounted on the shaft 152 within the sleeve 150 and is meshed with a bevel gear 170 mounted on the shaft 164 within the sleeve 150. Accordingly, rotation of the shaft 152 will cause rotation of the shaft 164. Further, the outer end of the shaft 154 includes a removable reduced end portion 176 which projects through an adjacent wall 178 of the housing 112 and has a gear wheel 180 mounted on its outer end. The end portion 176 is journaled by a bearing 182 supported from the end wall 178.

In operation, the lever 142 may be oscillated in either direction to bring the corresponding drive disc 130 into frictional engagement with the inner surface 160 of the drive disc 158. It is to be noted that the inner surface of the drive disc 158 is inclined approximately 52° relative to the axis of rotation of the shaft 152 and that the lever 142 may be centered so as to space both drive discs 130 out of contact with the inner surface 160 of the drive disc 158. If it is desired, power may be taken from the end portion 176 of the shaft 164 which generally parallels the power input shaft 116 or from the shaft 152. Further, the lever 142 and housing 112 may be provided with any suitable means (not shown) for retaining the lever 142 in adjusted oscillated positions.

From the foregoing it may be seen that the drive mechanisms 10 and 110 are very similar in operation except that the drive mechanism 110 has no provision whereby the ratio of the drive connection established thereby may be varied.

As hereinbefore set forth, various materials may be utilized in forming the friction surfaces of the various discs of the drive mechanisms 10 and 110. Further, the angle of the inner surfaces of the drive discs 44 and 158 is most desirably 52° relative to the longitudinal axes of the shafts 30 and 152. However, this angle may vary betweeen 42 and 62°.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. In combination, a support, a pair of shafts, journalled from said support for rotation about axes disposed at generally right angles relative to each other, a first drive member including a conical peripheral surface and mounted on one of said shafts for rotation therewith and adjustable axial shifting toward and away from the other shaft, a pair of second drive members including conical peripheral surfaces and mounted in axially spaced relation on the other of said shaft for rotation therewith and shifting axially therealong, a shift member mounted for adjustable shifting along said second shaft and disposed generally centrally between said second drive members, and thrust transmission means operatively connected between said shift member and said second drive members yieldingly biasing the latter in opposite directions along said one shaft relative to said shift member toward rest positions, said conical peripheral surfaces on said second drive members being selectively engageable with the conical peripheral surface on said first drive member upon axial shifting of said shift member, and thus said second drive members, along said second shaft.

2. The combination of claim 1 wherein said conical friction drive surface of said first drive member comprises an inside conical surface and said conical friction drive surfaces of said pair of drive members comprise outer conical surfaces.

3. The combination of claim 2 wherein said friction drive surface of said drive member is inclined between 42 and 62 degrees relative to the axis of rotation of the first drive member.

4. The combination of claim 3 wherein said drive surface of said first drive member is inclined approximately 52 degrees relative to the axis of rotation of said first drive member.

5. The combination of claim 1 wherein said other shaft includes splined portions on which said pair of drive members are keyed, said shift member including a sleeve disposed about said other shaft between said pair of drive members and keyed to said other shaft for rotation therewith, said thrust transmission means including a pair of stiff compression springs disposed about said other shaft and connected between opposite ends of said sleeve and said pair of drive members.

6. The combination of claim 5 including an operating lever oscillatably supported for angular displacement about an axis disposed normal to said axes, one end of said lever being disposed adjacent said other shaft and operatively connected to said sleeve for shifting of the latter along said other shaft in response to oscillation of said lever.

References Cited

UNITED STATES PATENTS

| | | | |
|---|---|---|---|
| 691,151 | 1/1902 | Leech et al. | 74—191 |
| 777,229 | 12/1904 | Vaughn | 74—191 |
| 1,225,144 | 5/1917 | Land | 192—89(X) |
| 1,330,863 | 2/1920 | Griffin | 74—191(X) |
| 3,479,891 | 11/1969 | Moore | 74—191 |
| 3,481,213 | 12/1969 | Macchia | 74—202 |

ALLAN D. HERRMANN, Primary Examiner

U.S. Cl. X.R.

74—202; 192—51, 48.91, 89